United States Patent [19]

Amacker

[11] 4,331,216

[45] May 25, 1982

[54] TREE CLIMBING STAND

[75] Inventor: Joseph A. Amacker, Tallulah, La.

[73] Assignee: Amacker, Inc., Tallulah, La.

[21] Appl. No.: 112,185

[22] Filed: Jan. 15, 1980

Related U.S. Application Data

[63] Continuation-in-part of Ser. No. 961,640, Nov. 17, 1978, which is a continuation-in-part of Ser. No. 873,285, Jan. 30, 1978, abandoned.

[51] Int. Cl.³ ............... A47C 9/10; A45F 3/26; A01M 31/02
[52] U.S. Cl. ................... 182/135; 182/136; 182/187
[58] Field of Search ............ 182/187, 135, 134, 129, 182/136

[56] References Cited

U.S. PATENT DOCUMENTS

| | | | |
|---|---|---|---|
| 3,043,397 | 7/1962 | Tillotson | 182/129 |
| 3,460,649 | 8/1969 | Baker | 182/134 |
| 3,485,320 | 12/1969 | Jones | 182/187 |
| 3,856,111 | 12/1974 | Baker | 182/187 |
| 3,955,645 | 5/1976 | Dye | 182/187 |
| 3,960,240 | 6/1976 | Cotton | 182/187 |
| 3,991,853 | 11/1976 | Bridges | 182/187 |

*Primary Examiner*—Reinaldo P. Machado
*Attorney, Agent, or Firm*—Wigman & Cohen

[57] ABSTRACT

The invention relates to an apparatus for climbing an upright columnar member such as a tree, pole or the like, utilizing two climbing elements. The first climbing element has a first upright member gripping structure, a movable platform spaced from the upright member to accommodate the body of the user in a sitting position, and a gun rack. The second climbing element has a second upright member gripping structure and a platform adjacent to the upright member to accommodate the feet of the user.

13 Claims, 6 Drawing Figures

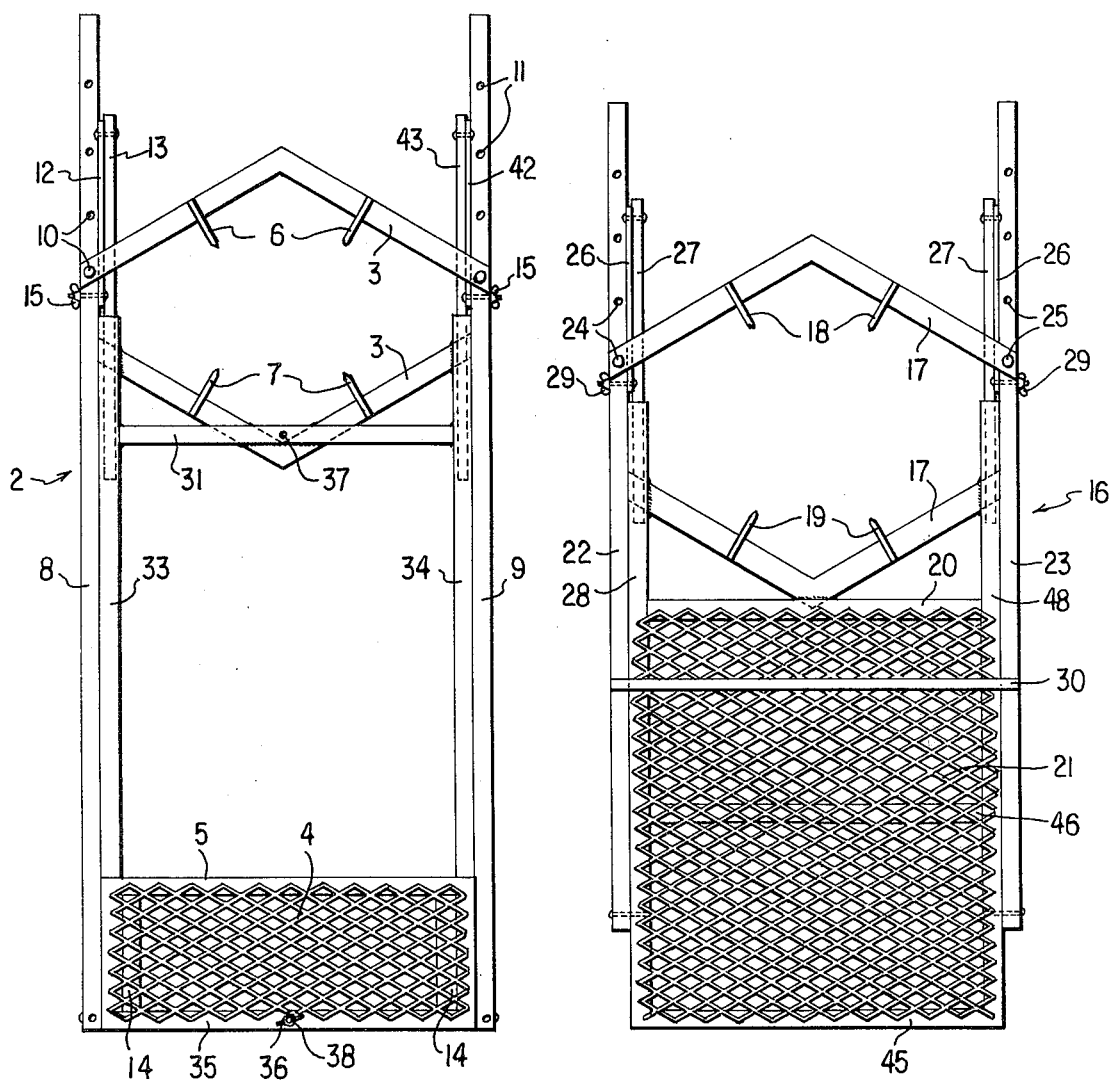

FIG. 4
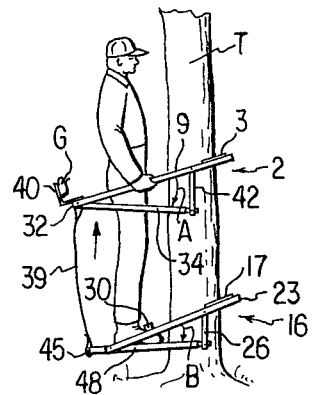
FIG. 5
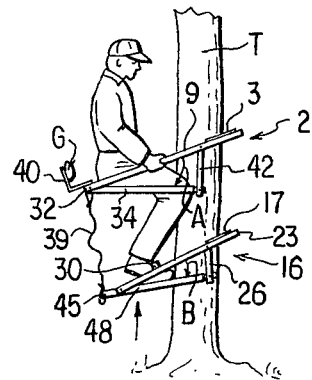
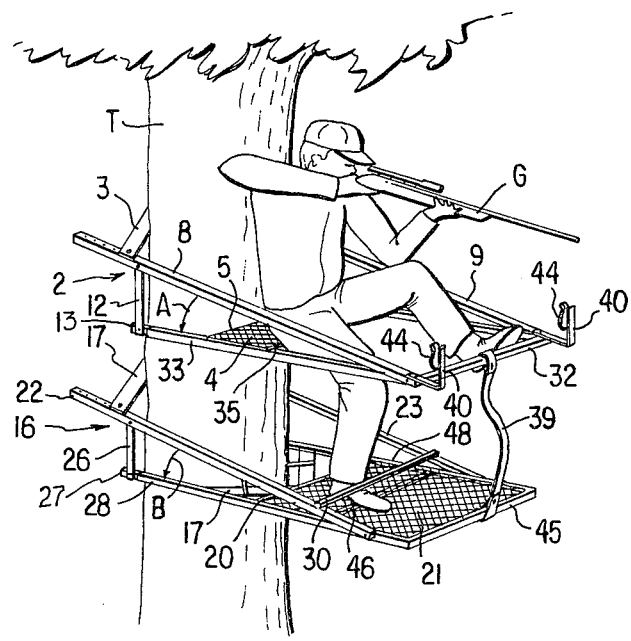
FIG. 6

TREE CLIMBING STAND

CROSS REFERENCE TO RELATED APPLICATIONS

The present application is a continuation-in-part of Ser. No. 961,640, filed Nov. 17, 1978, which is a continuation-in-part of Ser. No. 873,285, filed Jan. 30, 1978, now abandoned.

BACKGROUND OF THE INVENTION

1. Field of the Invention

The present invention relates to pole grasping-type climbers utilizing alternate grasping structures and, more particularly, to stands formed of two climbing members which are alternately raised by the user to attain a desired elevation in a tree, or on a pole or the like.

2. Description of the Prior Art

A variety of climbing stands, hunting platforms and other such climbing devices are commercially available but have been generally unsatisfactory for a number of reasons. Exemplary prior art patents relating to tree climbing stands include U.S. Pat. Nos. 3,485,320, 3,955,645, and 3,960,240.

Tree climbing stands known from the prior art are of two basic types: those comprised of a single tree climbing frame or platform and those which employ two climbing frames or elements. Examples of both types may be seen in U.S. Pat. Nos. 3,485,320; 3,460,649; 3,856,111; 3,955,645; and 3,991,853. Generally speaking, in one way or another, all of these prior art devices require the user to carry his gun or other weapon, such as a bow and arrow, on his back and to support his body weight by his arms and/or hands from or upon either the upper climbing element or the tree itself as the stand is raised or lowered on the tree or pole. This factor adds to the exertion required in attaining the desired elevation and is also unsafe to varying degrees.

One known climbing stand which does not require the user to support his body weight by his hands or arms while adjusting the elevation of the stand is disclosed in U.S. Pat. No. 3,960,240. However, this device requires the user to face away from the tree or pole and assume an extremely awkward and dangerous position while adjusting the upper climbing element.

In addition, once the desired elevation has been attained and the now stationary stand is in use, the prior art device typically requires the user to sit or stand with his back to the tree or pole, whether the user sits on the platform itself or on a seat connected thereto. In this position the user has side support only from the tree or pole surrounding the user. However, this frame is so wide and is spaced so far from the tree or pole that the user would have difficulty bracing himself simultaneously from more than one direction, for example, while attempting to take aim with a rifle. In other known patents, the devices require the hunter to attempt to shoot while standing, sometimes in a direction past the supporting tree. Thus, these devices place the hunter in an unstable and extremely dangerous position because of the rifle recoil and the inability to move the position of the seat.

Therefore, the primary drawbacks of the prior art are the difficulty and exertion required to use them, the instability of the hunter's position, the lack of side supports after placement, and the consequent danger to the user both in placing the stand and in using the stand after placement.

SUMMARY AND OBJECTS OF THE INVENTION

In view of the foregoing limitations and shortcomings of the prior art devices, as well as other disadvantages not specifically mentioned above, it should be apparent that there still exists a need in the art for a climbing stand which is safe and simple to use, both during and after placement on the tree, pole or the like, and during the removal therefrom. It is, therefore, a primary objective of this invention to fulfill this need by providing a simple, reliable climbing stand comprised of two frame members which surround the tree, pole, etc. These frame members include platforms upon which the user can either sit or stand while facing the tree, pole, etc., and can receive continual support from the rear.

More particularly, it is an object of this invention to provide a climbing stand comprised of an upper frame member and a lower frame member. The upper frame member includes a gripping means to engage the side of the tree or pole opposite the user and further includes a movable platform which is spaced from the tree to accommodate the body of the user in a sitting position. Furthermore, the upper frame member includes a rack for holding a gun or other weapon. There is also a gripping means to engage the side of the tree or pole facing the user. The lower frame member is similarly formed except that the platform is located adjacent the tree or pole to support the feet of the user.

It is a further object of the invention to provide means to enable the user to safely and securely hold the upper frame member to the lower frame member.

It is a further object of the invention to provide a climbing stand which, when in place, offers the user side support in any direction, thus eliminating the danger of falling when the hunter is shooting from awkward positions.

It is still a further object of the invention to provide a means for adjusting the angle formed by the movable sitting platform with the side support bars on the upper frame member so that the seat of the user may be maintained in a level position.

It is still a further object of the invention to provide a means for adjusting the angle formed by the standing platform with the side support bar on the lower frame member so that the feet of the user may be maintained in a level position.

BRIEF DESCRIPTION OF THE DRAWINGS

FIG. 2 is a top plan view of the first climbing element of the embodiment illustrated in FIG. 1;

FIG. 3 is a top plan view of the second climbing element of the embodiment illustrated in FIG. 2;

FIG. 4 illustrates the initial step of operating the present invention;

FIG. 5 illustrates the step of lifting the second climbing element along the height of a tree in operating the present invention; and FIG. 6 illustrates the present invention in its fully operating condition for use by the hunter with the movable seat having been slid to a position adjacent to the tree.

DETAILED DESCRIPTION OF A PREFERRED EMBODIMENT

Figure 1:
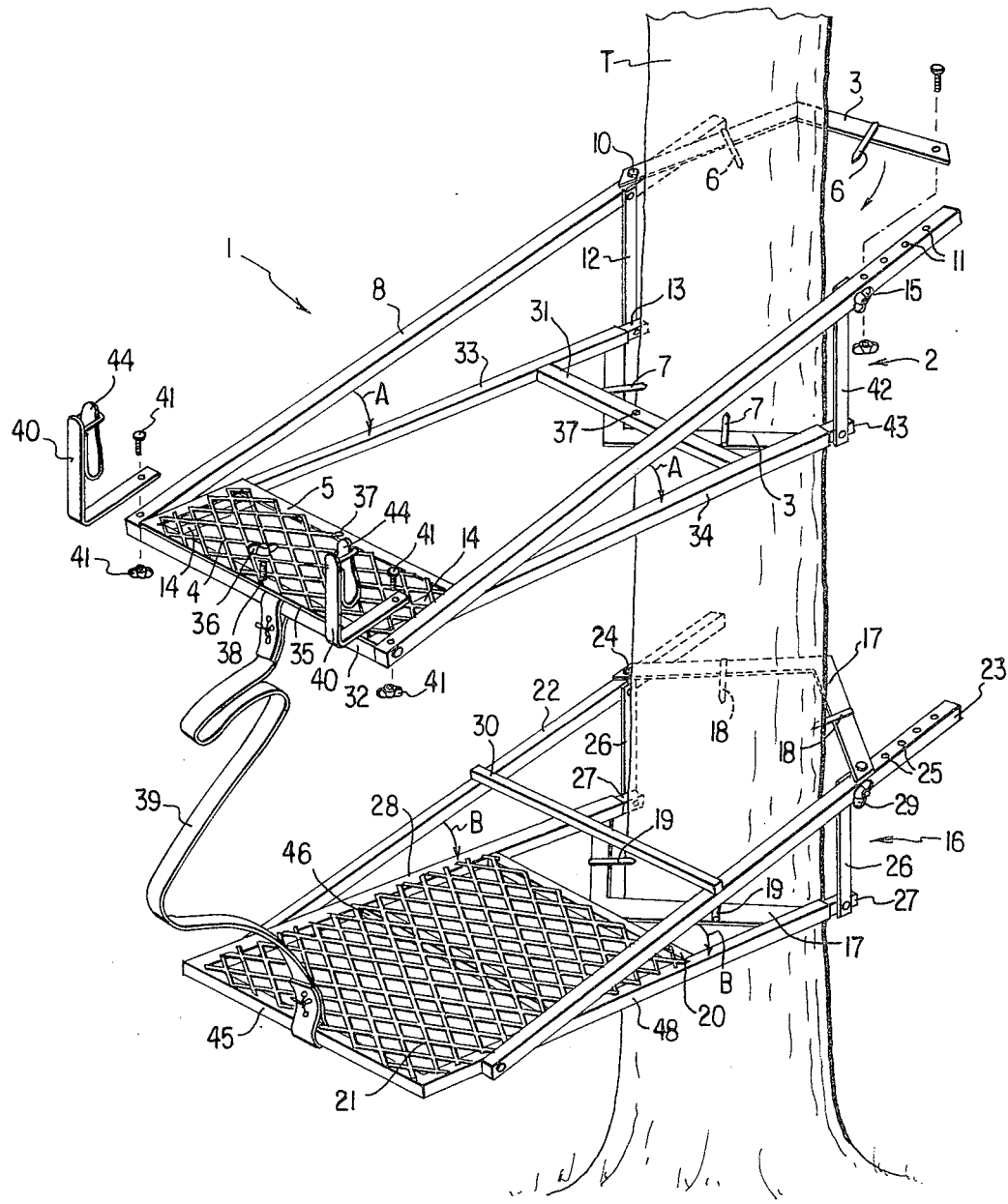
FIG. 1 is a perspective view of a preferred embodiment of the tree climbing stand of the present invention in an operating condition.

A tree climbing stand, generally noted by the reference numeral 1, is illustrated in FIG. 1. The tree climbing stand 1 is utilized by a hunter or another user for climbing a tree, generally designed by the reference character T in FIG. 1. Of course, the tree climbing stand 1 may be utilized for climbing other upright columnar members, such as telephone poles and the like.

The tree climbing stand 1 includes a first climbing means or upper frame member 2. This upper frame member 2 includes a first means 3 for gripping the tree T. The upper frame member 2 also includes a first movable platform means 4 spaced from the tree T or other upright member. This first movable platform means 4 accommodates the body of the hunter or other user in the space formed between its near edge 5 and a first cross bar 31. Alternatively, as shown in FIG. 6, the first movable platform means 4 accommodates the body of the hunter or other user in the space formed between its far edge 35 and a second cross bar 32. Thus, the space formed therebetween allows the first movable platform means 4 to accommodate the body of the user in either a sitting or climbing position.

The first gripping means 3 includes a first means 6 for engaging the side of the tree T opposite the hunter. The first gripping means 3 also includes a second means 7 for engaging the side of the tree T facing the hunter. Both the first engaging means 6 and the second engaging means 7 may be toothed elements such as those illustrated in FIGS. 1 and 2 of the drawings. However, in states where such toothed elements are outlawed or otherwise forbidden, rigid or pivoting frictional elements may be substituted for the toothed elements in order to satisfy the laws of the particular jurisdiction.

Besides the support given to the body of the user from the rear by the first movable platform means 4, support for the body of the user from the side is given by a first bar means 8 and a second bar means 9 connected together by the second cross bar 32 which acts as a far end brace for the first movable platform means 4. The first bar means 8 and the second bar means 9 together form upper side supports for the body of the user and have means 10 and 11, respectively, for adjusting the distance of the space between the tree T and the second cross bar 32 at the far edge of the first movable platform means 4. As may be readily seen in FIGS. 1 and 2 of the drawings, the first side support bar means 8 has its adjusting means 10 located on one of its ends. The adjustment of the distance between the tree T and the far edge of the first movable platform means 4 is carried out be setting the first engaging means 6 of the first gripping means 3 into an appropriate setting provided by a plurality of holes along each side of the side support bar means 8 and 9.

The upper frame member 2 also includes a first means for adjusting an angle A formed by a third side support bar means 33 with the first side support bar means 8. This first angle adjusting means includes an upstanding leg 12 and a first telescoping member 13 which is insertable into and out of the third side support bar means 33. This telescoping member 13 may be best seen in FIG. 2 of the drawings. Although this first angle adjusting means 12 has been described in relationship to the first and third side support bar means 8 and 33, respectively, there is a corresponding part (42,43) of the first angle adjusting means for adjusting the same angle A between the second side support bar means 9 and a fourth side support bar means 34. The third bar means 33 and the fourth bar means 34 together form middle side supports for the body of the user. The angle A is adjusted by loosening the wing nuts 15 or other fastening means and inserting the telescoping members 13 and 43 into the third and fourth side support bar means 33 and 34 so that the telescoping members 13 and 43 are in a desired position inside the bar means 33 and 34. Thus, because the first telescoping members 13 and 43 effectively form variable extensions of the third and fourth side support bar means 33 and 34, this first angle adjusting means allows the hunter or other user to maintain the first movable platform means 4 in a level position. The advantage of this particular first angle adjusting means is that the hunter or other user is therefore able to always sit in a level position. Once the first movable platform means 4 is level, the wing nuts 15 or other fastening means are retightened so that the angle A is maintained in the same position at all times.

The first movable platform means 4 is spaced from the tree T and slides by way of small spacer bars 14 attached by welding or other means to its underside along the third and fourth side support bar means 33 and 34 between extreme positions defined by the first and second cross bars 31 and 32. The first movable platform means 4 may be temporarily fixed to either the first or the second cross bars 31 and 32 by way of a nut and bolt arrangement 36. Apertures 37 are provided so that near edge 5 of the first movable platform means 4 may be temporarily fixed to the first cross bar 31 while apertures 38 are provided so that far edge 35 of the first movable platform means 4 may be temporarily fixed to the second cross bar 32.

A rack 40 is attached to the first upper bar means 8 and the second upper bar means 9 by nut and bolt arrangements 41. The rack 40 holds a gun G, shown in FIGS. 4–6, or another weapon, such as a bow and arrow. The rack 40 includes resilient clip means 44 for retaining the gun G or other weapon.

Also, as shown in FIGS. 1 and 4–6, the tree climbing stand 1 comprises a means for safely holding the first climbing means or upper frame member 2 together with a second climbing means or lower frame member 16. This safe holding means is a flexible strap 39 which has its ends looped and sewed or otherwise tied together around the cross bar 32 of the upper frame member 2 and around far edge 45 of the lower frame member 16 so that both frame members 2 and 16 are safely held to each other in the event that one or the other slips or is dropped by the user.

The second climbing means 16 is best seen in FIGS. 1 and 3, in particular. This lower frame member 16 includes a second means 17 for gripping the tree T. The second gripping means 17 includes a third means 18 for engaging the side of the tree T opposite the hunter or other user and a fourth means 19 for engaging the side of the tree T facing the hunter or other user. Both the third engaging means 18 and the fourth engaging means 19 are preferably toothed elements. However, in states where the use of such toothed elements are outlawed or otherwise prohibited, rigid or pivotable frictional elements may be substituted therefor in order to comply with the laws of the particular jurisdiction. The part of the second gripping means 17 on which the fourth engaging means 19 is located is attached to the forward edge 20 of a second platform means 21 and may be welded together to the underside thereof. This second platform means 21 is positioned adjacent to the tree T or other upright member and accommodates the feet of the hunter or other user. This second platform means 21 accommodates the feet of the hunter either in a sitting position or in a climbing position. Furthermore, this second platform means 21 may accommodate the feet of the hunter or other user in a standing position.

The lower frame member 16 further includes first, second, third and fourth lower side bar means 22, 23, 28 and 48, respectively, for supporting the feet of the user from the side. The bar means 22 and 23, in particular, help prevent the hunter or other user from accidentally stepping off the side of the second platform means 21.

The side bar means 22 and 23 include, at one end, means 24 and 25 for adjusting the distance of a space between the third engaging means 18 and the fourth engaging means 19 so that the tree T or other upright member is accommodated therebetween. The adjustment is carried out by inserting each end of the third engaging means 18 into the appropriate hole of a plurality of holes spaced along a part of the length of the bar means 22 and 23.

The lower frame member 16 further includes second means for adjusting an angle B formed by the third and fourth lower side bar means 28 and 48 with the first and second lower side bar means 22 and 23. This second adjusting means includes upstanding elements 26 and secondary telescoping members 27 fully extendible from the third and fourth lower bar means 28 and 48 along the sides of the second platform means 21. A wing nut 29 or other fastening means may be secured to the bar means 22 and 23 so that the angle B may be fixed. In order to change the angle B from 0°, this second angle adjusting means (26,27) is operated by loosening the wing nut 29 or other fastening means and by inserting the telescoping members 27 into the side bars 28 and 48 of the second platform means 21. By inserting the telescoping members 27 into the side bars 28 and 48 of the second platform means 21 in a desired position, the effective length of the side bars 28 and 48 of the second platform means 21 is therefore shortened and, consequently, the angle B formed with the bar means 22 and 23 is also changed. Thus, the hunter or other user, by changing the angle B, is able to maintain the second platform means 21 in a substantially level position for accommodating his or her feet during the use of the tree climbing stand 1. By retightening the wing nut 29 or other fastening means, the hunter or other user is able to fix the second platform means 21 at the newly desired angle B. The lower frame member 16 also includes a bar means 46 for supporting the second platform means 21 from the underside. This supporting bar means 46 extends between the third side bar means 28 and the fourth side bar means 48 at substantially right angles thereto.

A bar means 30 allows lifting of the lower frame member 16 by the feet of the hunter or other user. This lifting bar means 30 extends between the left side support bar means 22 and the right side bar support 23 at substantially right angles thereto.

The preferred method of operating the tree climbing stand 1 will now be described. Before the hunter or other user may operate the tree climbing stand 1, certain preliminary steps should be taken. These preliminary steps, as well as the actual steps of operating the tree climbing stand 1, may be best understood by a study of FIGS. 4-6.

One preliminary step of the preferred method of operating the tree climbing stand 1 requires adjusting the distance of the space between the third engaging means 18 and the fourth engaging means 19 shown in FIGS. 1 and 3 so that the tree T or other upright member is accommodated therebetween. This step is accomplished by fixing the distance adjusting means 24 and 25 also shown only in FIGS. 1 and 3 at the proper location along the bar means 22 and 23.

Once the tree T or other upright member is accommodated between the third engaging means 18 and the fourth engaging means 19, the angle B of the side bars 28 and 48 of the second platform means 21 may be adjusted so that the second platform means 21 is level in order to accommodate the feet of the hunter or other user in a safe and otherwise stable manner. This preliminary step of adjusting the second angle B may comprise, if necessary, the step of inserting, either partially or wholly, the secondary telescoping members 27 into the side bars 28 and 48 of the second platform means 21. See FIGS. 1 and 6, in particular.

Once the preliminary steps relating to the lower frame member 16 have been completed, the preliminary steps relating to the upper frame member 2 may be taken. Initially, the first platform means 4 should be slid over so that the apertures 38 in its far edge 35 are aligned with apertures 38 in the cross bar 32. The first platform means 4 is then temporarily fixed by nut and bolt arrangement 36 to the cross bar 32. Thus, this adjusting step of the distance of the space between the tree T or other upright member and the forward edge 5 of the first platform means 4 allows the hunter or other user to accommodate his body in either a sitting, standing, or climbing position.

If it is necessary to do so, the hunter or other user may perform another preliminary step of adjusting the first angle A formed by the third and fourth middle side support bar means 33 and 34 with the first and second upper side support bar means 8 and 9, respectively. This first angle adjusting step includes the substep of withdrawing the first telescoping members 13 from within the third and fourth side bar means 33 and 34 in order to make the first platform means 4 level or substantially level in order to accommodate the hunter or other user in a sitting position.

After the preliminary steps relating to adjusting the upper frame member 2 have been completed, the actual steps employed in the preferred method of climbing the tree T or other upright columnar member may be undertaken.

The first step requires the hunter or other user to step inside the space formed between the tree T or other upright member and the forward edge 5 of the first platform means 4. It should be pointed out that, if it is preferred to do so, the preliminary steps relating to the adjustment of the upper frame member 2 may be carried out at this time. Also, the hunter may place his or her gun G or other weapon in the rack 40 either before or after stepping inside the space formed between the tree T and the forward edge 5 of the first platform means 4. In either event, the resilient clips 44 will retain the gun G or other weapon during the climbing of the tree T by the hunter.

After the hunter or other user has stepped inside the space formed between the tree T or other upright member and the forward edge 5 of the first platform means 4, the hunter or other user places his or her weight on the second platform means 21 by standing thereon so that his or her feet may be accommodated on the second climbing means or lower frame member 16. Now, the hunter or other user, as illustrated in FIG. 4, is ready to begin climbing the tree T.

The next step in the preferred method of climbing the tree T is also illustrated in FIG. 4. Basically, the hunter lifts the first climbing means or upper frame member 2 with his arms along the height of the tree T and sets the upper frame member 2 at a first selected height of the tree T so that the first gripping means 3 grips the tree T. As noted hereinabove, the first gripping means 3 includes the first engaging means 6 and the second engaging means 7. This step of setting the upper frame member 2 is completed by shifting the weight of the hunter from the second platform means 21 to the first platform means 4 by sitting on the latter. This shifting of weight causes the engaging means 6 and 7 of the first gripping means 3 to grasp the tree T.

Thereafter, the hunter carries out the next step in the preferred method of climbing the tree T by lifting the lower frame member 16 along the height of the tree T. This step of lifting the lower frame member 16 is accomplished by placing the feet of the hunter under the bar means 30 for lifting the second platform means 21. Note the position of the legs of the hunter in FIG. 5 in relationship to his legs in FIG. 4.

The next step in the preferred method of climbing the tree T is setting the lower frame member 16 along the height of the tree T. This step is completed by shifting the weight of the hunter from the first platform means 4 to the second platform means 21 by standing on the latter. This shifting of the weight of the hunter, by alternately standing and sitting, enables one, by way of the various gripping means, to appropriately engage and disengage the tree T.

After the hunter has reached a desired position along the height of the tree T, he may turn around and sit, as he is illustrated in FIG. 6, on the first platform means 4 or he may simply stand on the second platform means 21. To assume the sitting position shown in FIG. 6, the hunter untightens the nut and bolt arrangement 36 shown in FIG. 1 in order to remove the first platform means 4 from its temporarily fixed position and shifts the movable platform means 4 to the position where the apertures 37 in its forward edge 5 are aligned with the apertures 37 in the first cross bar 31 adjacent to the tree T. The nut and bolt arrangement 36 is then fastened therethrough so that the hunter may turn around and sit on the first platform means 4. The hunter may then remove his gun G, as shown in FIG. 6, and be ready to fire when necessary.

Although only a single preferred embodiment of the apparatus is specifically illustrated and described herein, it will be appreciated that many modifications and variations of the present invention are possible in light of the above teachings and are within the purview of the appended claims without departing from the spirit and intended scope of the present invention.

I claim:

1. An apparatus for climbing upright columnar members, comprising:
   first climbing means for accommodating the body of a user, said first climbing means including first means for gripping the upright columnar member, first and second upper bar means for supporting the body of the user from the side, and third and fourth middle bar means for supporting the body of the user from the side;
   a first platform means, spaced from said upright columnar member and movable along said third and fourth middle bar means, for supporting the body of the user in a sitting position;
   first and second cross bar means for acting as end braces for the first platform means near to and far from, respectively, the upright columnar member;
   rack means, attached to said first climbing means, for holding a gun or other weapon;
   second climbing means for accommodating the feet of the user, said second climbing means including second means for gripping the upright columnar member, and first and second lower bar means for supporting the feet of the user from the side; and
   a second platform means, spaced from said upright columnar member, for supporting the feet of the user from the bottom.

2. The apparatus, according to claim 1, further comprises a means for safely holding the first and second climbing means together.

3. The apparatus, according to claim 2, wherein the safe holding means is a flexible strap.

4. The apparatus, according to claim 1, wherein the rack means is attached to the first and second upper bar means of the first climbing means.

5. The apparatus, according to claim 1, wherein the rack means includes resilient clip means for retaining the gun or other weapon.

6. The apparatus, according to claim 1, further comprises means for temporarily fixing the first platform means to the first climbing means.

7. The apparatus, according to claim 6, wherein the temporary fixing means is a nut and bolt arrangement.

8. The apparatus, according to claim 1, wherein the first platform means includes spacer bar means, attached to its underside, for sliding the first platform means along the third and fourth middle bar means between the first and second cross bar means.

9. An apparatus for climbing upright columnar members, comprising:
   first climbing means for accommodating the body of a user, said first climbing means including first means for gripping the upright columnar member, first and second upper bar means for supporting the body of the user from the side, third and fourth middle bar means forming an angle with the first and second upper bar means for supporting the body of the user from the side, and telescoping members positioned within the third and fourth middle bar means for adjusting said angle;
   a first platform means, spaced from said upright columnar member and movable along said third and fourth middle bar means, for supporting the body of the user in a sitting position;
   rack means, attached to said first climbing means, for holding a gun or other weapon;
   second climbing means for accommodating the feet of the user, said second climbing means including second means for gripping the upright columnar member, and first and second lower bar means for supporting the feet of the user from the side; and
   a second platform means, spaced from said upright columnar member, for supporting the feet of the user from the bottom.

10. An apparatus for climbing upright columnar members, comprising:
    first climbing means for accommodating the body of a user, said first climbing means including first means for gripping the upright columnar member, first and second upper bar means for supporting the body of the user from the side, and third and fourth middle bar means for supporting the body of the user from the side;
a first platform means, spaced from said upright columnar member and movable along said third and fourth middle bar means, for supporting the body of the user in a sitting position;
rack means, attached to said first climbing means, for holding a gun or other weapon;
a second platform means, spaced from said upright columnar member, for supporting the feet of the user from the bottom, said second platform means having side edges; and
second climbing means for accommodating the feet of the user, said second climbing means including second means for gripping the upright columnar member, first and second lower bar means forming an angle with the second platform means for supporting the feet of the user from the side and telescoping members positioned within the side edges of the second platform means.

11. Apparatus for climbing upright columnar members comprising:
first climbing means for accommodating the body of a user, said first climbing means including first means for gripping the columnar member;
second climbing means for accommodating the feet of the user, said second climbing means including second means for gripping the columnar member;
first platform means associated with said first climbing means for supporting the body of the user in a sitting position;
means for slidably mounting said first platform means on said first climbing means such that said first platform means is movable between a first platform position spaced from the columnar member a distance sufficient to accommodate the body of the user between said columnar member and said first platform means, said first platform position being for use when the user is climbing the columnar member and a second platform position closely adjacent the columnar member for use after the user has reached the desired elevation on the columnar member;
second platform means associated with said first climbing means for supporting the feet of the user; and
said mounting means including spacer bar means attached to said first platform means for slidably guiding said first platform means between said first and second platform positions.

12. Apparatus for climbing upright columnar members comprising:
first climbing means for accommodating the body of a user, said first climbing means including first means for gripping the columnar member;
second climbing means for accommodating the feet of the user, said second climbing means including second means for gripping the columnar member;
first platform means associated with said first climbing means for supporting the body of the user in a sitting position;
means for slidably mounting said first platform means on said first climbing means such that said first platform means is movable between a first platform position spaced from the columnar member a distance sufficient to accommodate the body of the user between said columnar member and said first platform means, said first platform position being for use when the user is climbing the columnar member and a second platform position closely adjacent the columnar member for use after the user has reached the desired elevation on the columnar member;
second platform means associated with said first climbing means for supporting the feet of the user; and
means for removably securing said first platform means in each of said platform positions such that said first platform means is non-slidably secured at a selected one of said positions.

13. Apparatus for climbing upright columnar members comprising:
first climbing means for accommodating the body of a user, said first climbing means including first means for gripping the columnar member;
second climbing means for accommodating the feet of the user, said second climbing means including second means for gripping the columnar member;
first platform means associated with said first climbing means for supporting the body of the user in a sitting position;
means for slidably mounting said first platform means on said first climbing means such that said first platform means is movable between a first platform position spaced from the columnar member a distance sufficient to accommodate the body of the user between said columnar member and said first platform means, said first platform position being for use when the user is climbing the columnar member and a second platform position closely adjacent the columnar member for use after the user has reached the desired elevation on the columnar member;
second platform means associated with said first climbing means for supporting the feet of the user; and
said first climbing means including cross bar means for acting as end braces for said first platform means when said first platform means is located in said platform positions.

* * * * *